(12) United States Patent
Rasmussen et al.

(10) Patent No.: US 8,657,553 B1
(45) Date of Patent: Feb. 25, 2014

(54) ROLLER TRACK LOADING DEVICE

(76) Inventors: Stephen S. Rasmussen, Minocqua, WI (US); Bernhard Koszewa, Neenah, WI (US)

( * ) Notice: Subject to any disclaimer, the term of this patent is extended or adjusted under 35 U.S.C. 154(b) by 200 days.

(21) Appl. No.: 13/065,984

(22) Filed: Apr. 4, 2011

(51) Int. Cl.
*B65G 13/12* (2006.01)
*B65G 13/11* (2006.01)

(52) U.S. Cl.
CPC ............... *B65G 13/12* (2013.01); *B65G 13/11* (2013.01)
USPC ...... 414/535; 414/529; 280/414.1; 193/35 SS

(58) Field of Classification Search
CPC .............................. B65B 13/00; B65B 13/12
USPC ................. 280/414.1; 414/276, 476, 535; 193/35 SS
See application file for complete search history.

(56) References Cited

U.S. PATENT DOCUMENTS

| | | | |
|---|---|---|---|
| 2,260,046 A | 10/1941 | Lafaye, Sr. | |
| 2,795,432 A | 6/1957 | Martt | |
| 3,185,330 A | 5/1965 | Buckner | |
| 3,243,029 A * | 3/1966 | Oliver | 193/35 SS |
| 4,103,926 A * | 8/1978 | Johnston et al. | 280/414.1 |
| 4,468,150 A | 8/1984 | Price | |
| 4,505,619 A | 3/1985 | Sargent | |
| 4,679,812 A | 7/1987 | Byrnes | |
| 4,852,712 A * | 8/1989 | Best | 193/35 TE |
| 4,893,828 A | 1/1990 | Godbersen | |
| 4,930,612 A * | 6/1990 | Thorndyke | 193/35 SS |
| 5,088,585 A * | 2/1992 | Lambert | 193/35 SS |
| 5,174,596 A | 12/1992 | Benest | |
| 6,099,014 A | 8/2000 | McLaughlin | |
| 6,341,793 B2 | 1/2002 | Braun | |
| 7,281,728 B1 * | 10/2007 | Wayrynen | 280/414.1 |
| 7,455,310 B2 | 11/2008 | Hyslop | |
| 7,469,917 B1 * | 12/2008 | Heuiser | 280/414.3 |
| 2011/0303508 A1 * | 12/2011 | Hou et al. | 198/346.1 |

OTHER PUBLICATIONS

U.S. Appl. No. 10/028,247, filed Nov. 18, 2010, William J. Hyslop.

* cited by examiner

*Primary Examiner* — Saul Rodriguez
*Assistant Examiner* — Brendan Tighe
(74) *Attorney, Agent, or Firm* — Mark J. Hanson; Mathew R. P. Perrone, Jr.

(57) ABSTRACT

A loading device and method hydraulically support or move rollers, in order to deal with loading unloading bulky or heavy objects, such as a boat from a trailer.

5 Claims, 5 Drawing Sheets

ROLLER TRACK LOADING DEVICE

This invention relates to a loading device and method, and more particularly to a loading device and method suitable for lifting a bulky item to transport base or lowering that from the transport base.

BACKGROUND OF THE INVENTION

Maneuvering or handling a bulky, possibly heavy, object is difficult. To develop an easily operable device to assist with those functions can provide great advantages to a person, who routinely must deal with that bulky object. Yet, the combination of bulk and weight mitigates against a simple solution to the problem.

This will especially be true with regard to water craft. Many people enjoy owning a boat and using the same. Transporting the boat from point to point, for either use or storage is greatly complicated by the size and weight of the boat. In an attempt to solve this problem, a boat owner is known to use of a procedure known as power loading. This procedure involves aligning a boat up with the trailer and using the motor of the boat to load or put the boat on the trailer.

There are problems with a water craft user who is power loading a boat onto a trailer at the boat launch. Power loading is loading the water craft onto the trailer by using the motor of the water craft. Using this type of propeller action will ruin the dredging work that is usually done at a boat launch. Some boats are designed to drive off the water and onto the trailer.

An alternative for the power loading boat process is to use a winch for loading. The line required for a winch can create problems. The durability of the winch creates other problems.

With power loading, the resulting propeller wash can erode the sediment just beyond the ramp surface, creating a large hole. The eroded sediment is deposited behind the propeller, creating a mound. Trailer tires can get stuck in these holes, and boats can run aground on the mound. Instead of power loading, other devices are better for loading the trailer with the boat.

Use of rollers to overcome these problems create more difficulties. If the rollers are high enough to be effective, damaged the boat, usually below the waterline, can occur. If the rollers are low in an attempt to minimize such damage, ease of loading and unloading, especially of a boat, is compromised. Furthermore, the roller system has to easily allow loading of the boat, while at the same time, provide stability and security while the boat is loaded on the trailer. To provide one of these requirements, usually weakens the ability for the roller system to provide the other.

Clearly, it is very desirable to develop a system to overcome these problems with a boat or other heavy, bulky items. If this system is durable and reliable, problems with those items can be greatly reduced.

SUMMARY OF THE INVENTION

Among the many objectives of the present invention is the provision of a loading device and method for use on heavy or bulky objects.

Another objective of the present invention is the provision of a loading device and method, which has durability.

Also, an objective of the present invention is the provision of a loading device and method, which has reliability.

Moreover, an objective of the present invention is the provision of a loading device and method, which has great utility.

A further objective is the provision of a loading device and method for use on a boat.

Another objective of the present invention is the provision of a loading device and method, which has durability for use on a boat and in the marine environment.

Also, an objective of the present invention is the provision of a loading device and method, which has reliability for use on a boat and in the marine environment.

Moreover, an objective of the present invention is the provision of a loading device and method, which has great utility for use on a boat.

These and other objectives of the invention (which other objectives become clear by consideration of the specification, claims and drawings as a whole) are met by providing a loading device and method, which hydraulically supports or moves rollers, in order to deal with bulky or heavy objects.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
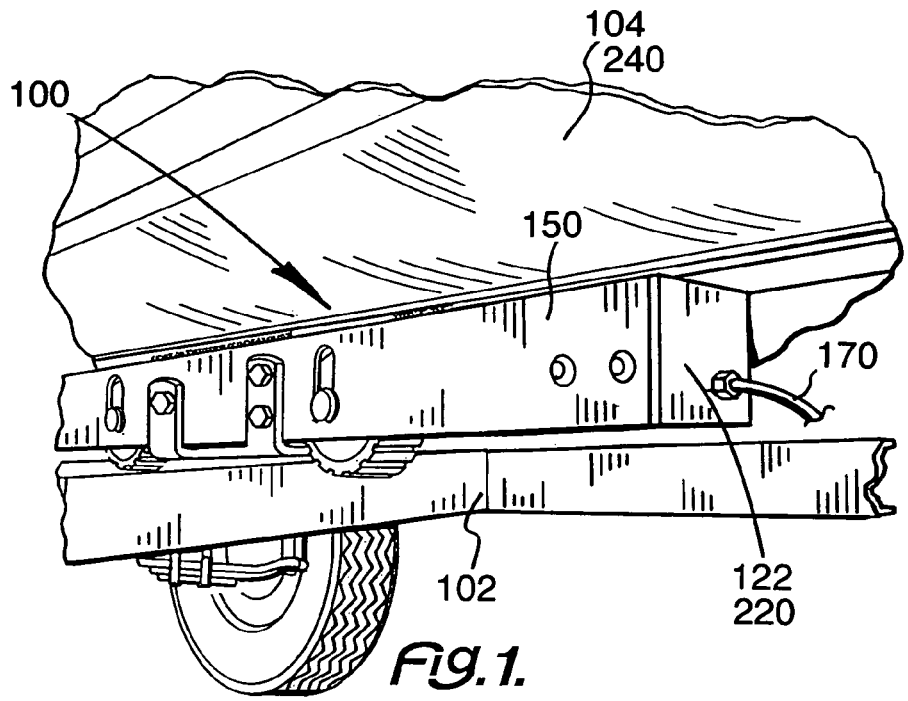
FIG. 1 depicts a perspective view of the loading device 100 of this invention in use on a boat trailer 102.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

With the loading device of this invention, there is a housing receiving an adjustable wheel or roller assembly, with the adjusting device for the wheel or roller assembly preferably including a hydraulic assembly. The wheels or rollers of the wheel or roller assembly are movable, so that they be contained entirely within the housing as a storage position or raised above a surface of the housing when use is desired. Such a structure is useful for lifting or moving any heavy or bulky object. This loading device is especially useful on boat trailers.

Figure 2:
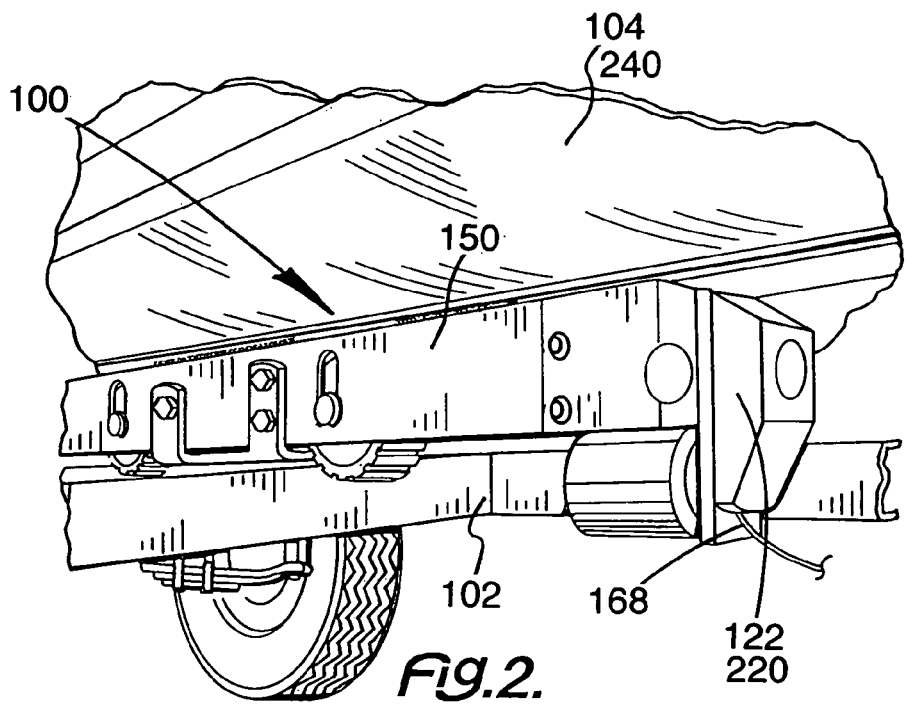
FIG. 2 depicts a perspective view of the loading device 100 of this invention in use on a boat trailer 102.
Figure 3:
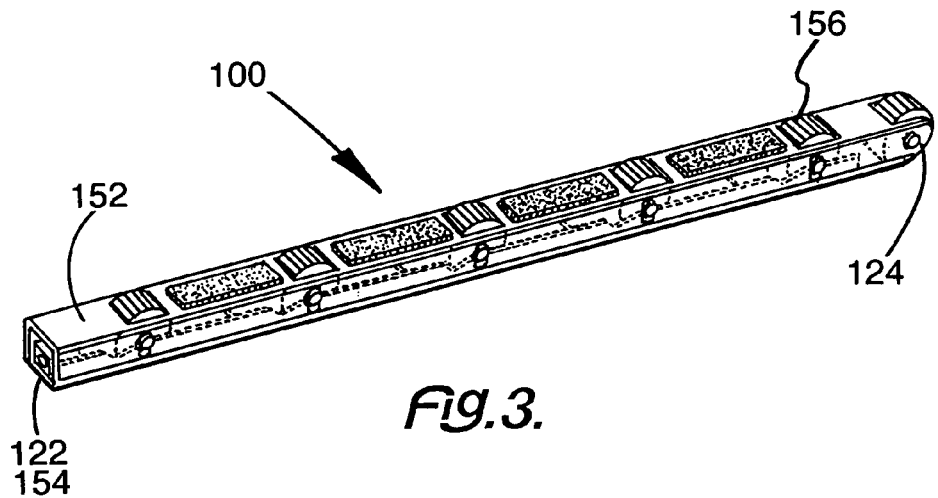
FIG. 3 depicts a perspective view of the roller assembly 120 for loading device 100 of this invention.
Figure 4:
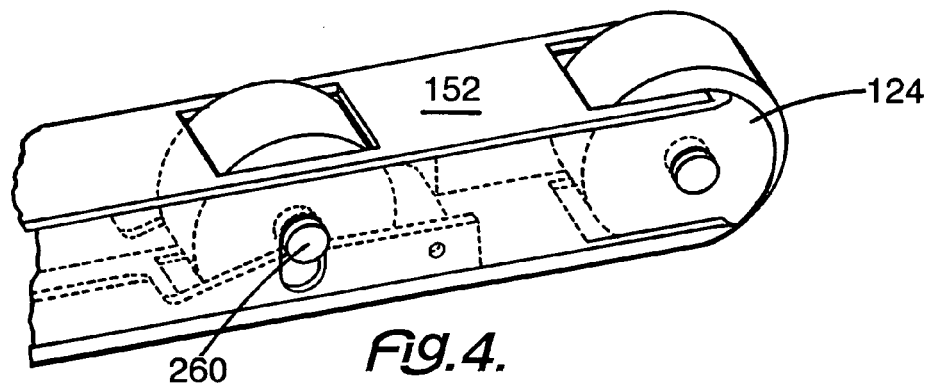
FIG. 4 depicts a perspective view of the static end 124 for roller assembly 120 of the loading device 100 of this invention.

Referring now to FIG. 1 and FIG. 2, the loading device 100 of this invention is in use on a boat trailer 102. Boat 104 rests on loading device 100 of this invention. Loading device 100 has housing 150 which contains roller assembly 120. Hydraulic system 220 is present on hydraulic end 122. The combination of the roller assembly 120 and hydraulic system 222 is sometimes referred to as adjusting device. In FIG. 2, hydraulic system 220 is replaced with an electrical connection 168. While a hydraulic system 220 and an electrical connection 168 are depicted any suitable powering method can be utilized including air system.

Furthermore, in this embodiment, loading device 100 is shown loading a boat 104. However, loading device 100 can be used to lift and maneuver any heavy or bulky item 240.

Figure 7:
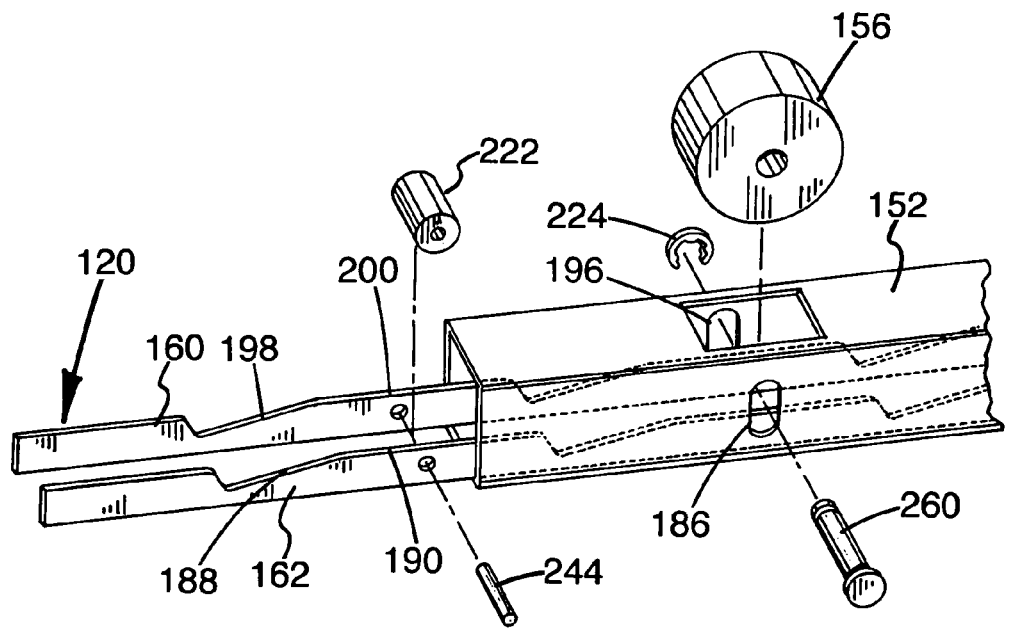
FIG. 7 depicts a partially exploded perspective view of roller assembly 120.
Figure 8:
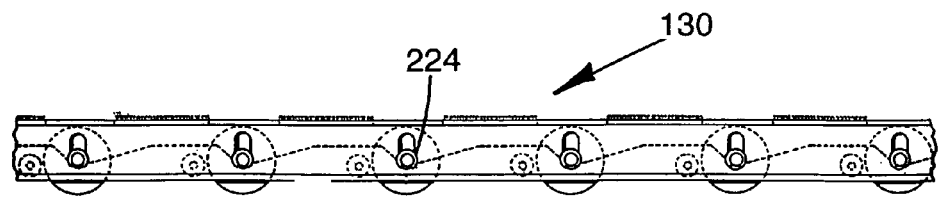
FIG. 8 depicts a side view of the roller assembly 120 of the loading device 100 of this invention in retracted position 130.
Figure 9:
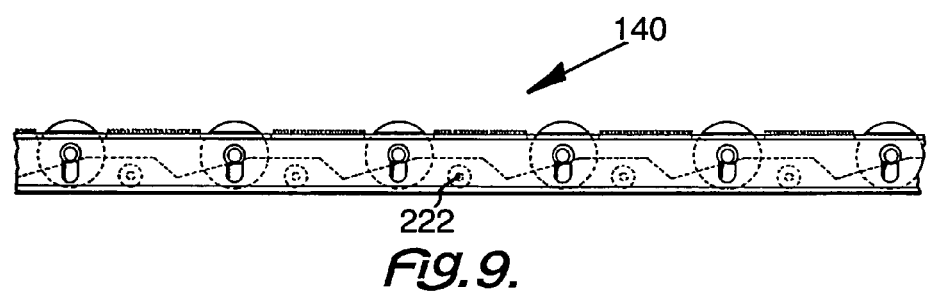
FIG. 9 depicts a side view of the roller assembly 120 of the loading device 100 of this invention in use position 140.
Figure 10:
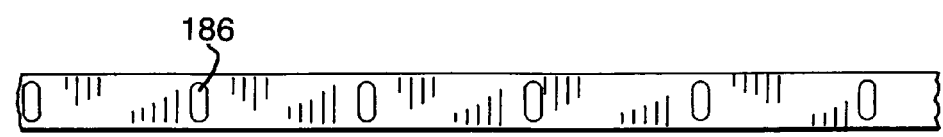
FIG. 10 depicts a side view of the housing 150 for the roller assembly 120 of the loading device 100 of this invention.
Figure 11:
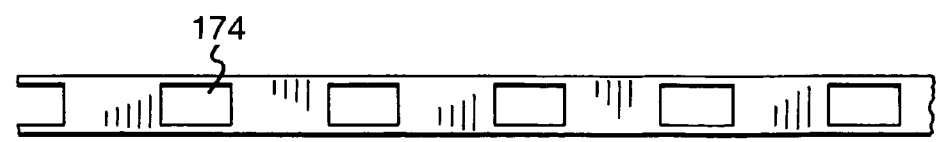
FIG. 11 depicts a top plan view of the housing 150 for the roller assembly 120 of the loading device 100 of this invention.
Figure 12:
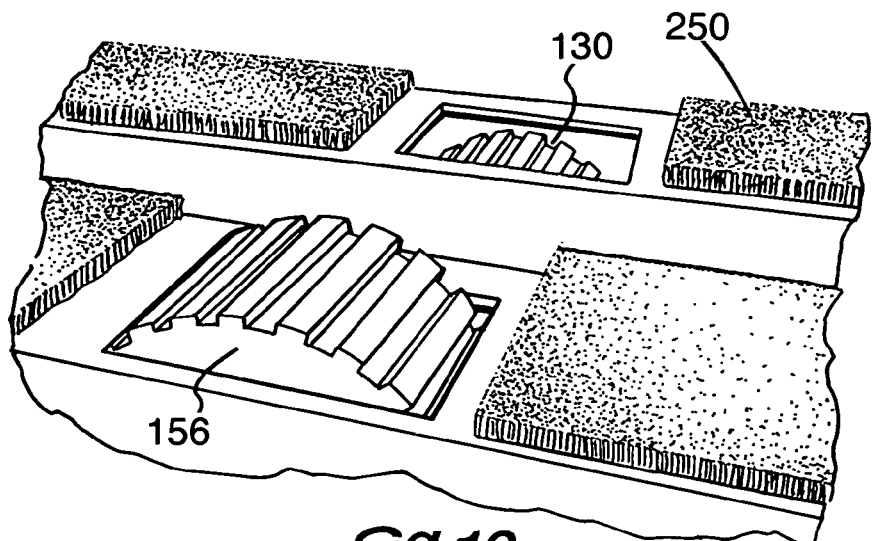
FIG. 12 depicts a top perspective view for a pair of roller assemblies 120 of the loading device 100 of this invention comparing retracted position 130 and use position 140.

Adding FIG. 3, FIG. 4, FIG. 5, and FIG. 6 to the consideration, the roller assembly or adjustable wheel assembly 120 (See FIG. 7) for loading device 100 of this invention includes housing 150. Housing 150 has a top platform 152 and a bottom platform 154. A plurality of wobble rollers 156 are mounted in housing 150 between top platform 152 and bottom platform 154. A first lift slide rail 160 and a second lift slide rail 162 support the wobble rollers 156 within housing 150 between top platform 152 and bottom platform 154.

At one end of the housing 150 is a hydraulic connection 170. The hydraulic connection 170 serves to move the wobble rollers 156 as desired. Oppositely disposed from the hydraulic connection 170 is an end roller 172.

The hydraulic connection 170 cooperates with first lift slide rail 160 and second lift slide rail 162 to maneuver wobble rollers 156 as desired.

Top platform 152 includes a platform slot 174 for each wobble roller 156. When wobble roller 156 extends above top platform 152, use position 140 is achieved. When wobble roller 156 is below top platform 152, retracted position 130 is achieved.

First lift slide rail 160 and second lift slide rail 162 are symmetrical. The housing 150 is interrupted by a first u-shaped slot 186 and a second u-shaped slot.

Each wobble roller 156 has an axle 260. Axle 260 is of sufficient length to support each wobble roller 156 within first u-shaped slot 186 and second u-shaped slot 196. Axle 260 is also of sufficient length to support each wobble roller 156 on first inclined plane 188 second inclined plane 198 (See FIG. 7) due to the presence of a holding device such as c-clip 224 on axle 260.

Figure 5:
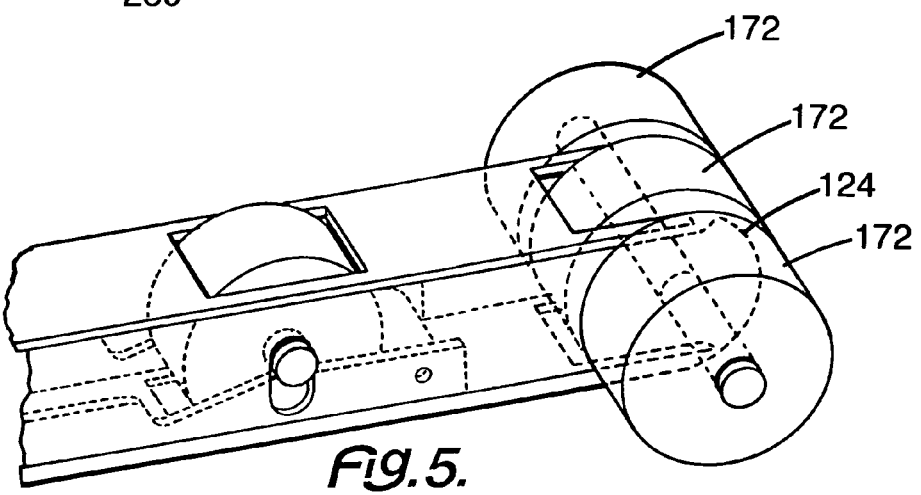
FIG. 5 depicts a perspective view of the static end 124 for roller assembly 120 of the loading device 100 of this invention.
Figure 6:
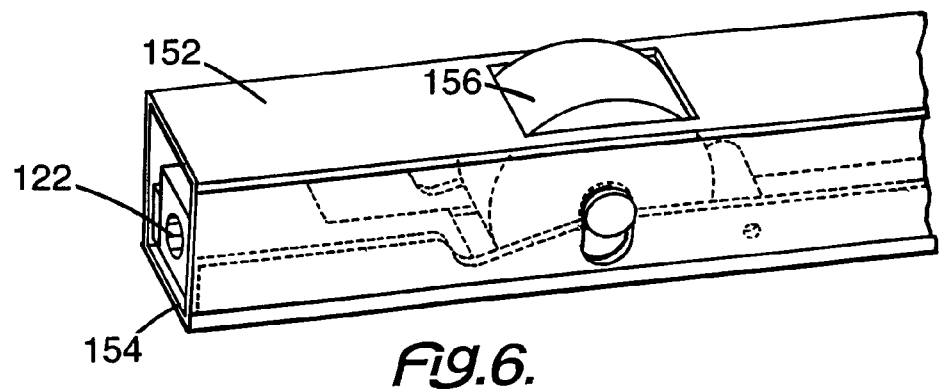
FIG. 6 depicts a perspective view of the hydraulic end 122 used with the roller assembly 120 of the loading device 100 of this invention.

Referring specifically to FIG. 5, any number of end rollers 172 can be present to support boat 104 or item 240. In the preferred embodiment, three end rollers 172 are present. However, this number may be increased or decreased to accommodate for the boat 104 or item 240.

Now adding FIG. 7, FIG. 8, FIG. 9, FIG. 10, FIG. 11, and FIG. 12 to the consideration, the structure of roller assembly 120 can be clearly seen. First lift slide rail 160 and second lift slide rail 162 are contained in housing 150. Slide rails 160 and 162 have a first lift slide 188 and a second lift slide 198. Between each first lift slide 188 is a first raised edge 190 and between each second lift slide 198 is a second raised edge 200. Slide rails 160 and 162 can have as many lift slides 188 and 198 interspersed with raised edges 190 and 200 as the particular application requires.

Hydraulic system 220 uses hydraulic connection 170 to move the roller assembly 120 as desired. Hydraulic system 220 operates a support roller 222 for each wobble roller 156. On axle 260 is a c-clip 224 locking wobble roller 156 is a slidable fashion in u-shaped slot 156. As the hydraulic system 220 moves each support roller 222, wobble roller 156 is moved from a retracted position 130 to a use position 140 as desired.

Hydraulic system moves the first lift slide rail 160 and second lift slide rail 162 back and forth in a linear motion. Support rollers 222 move with the lift slide rails 160 and 162 and protect slide rails 160 and 162 from housing 150. Thus, support rollers 222 and lift slide rails 160 and 162 create a rolling relationship.

Wobble rollers 156 cooperates and moves with lift slide rails 160 and 162. Wobbles rollers are positioned on the lift slide rails 160 and 162. Wobble rollers 156 are lifted as they reach first lift slide 188 and second lift slide 198. Use position 140 is achieved when wobble rollers 156 reach the platform of first raised edge 190 and second raised edge 200. Retracted position 130 is achieved when wobble rollers 156 travel in the reverse direction and reach the bottom of first lift slide 188 and second lift slide 198.

Figure 13:
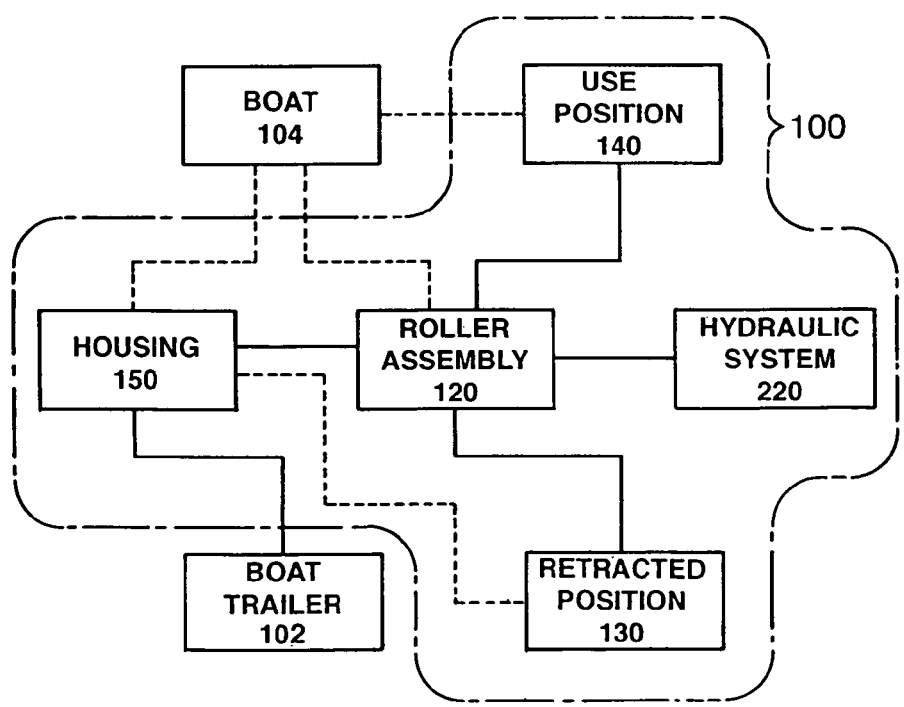
FIG. 13 depicts a block diagram for roller assembly 120 of loading device 100.

With FIG. 13, roller assembly 120 for loading device 100 is mounted in housing 150. Hydraulic system 220 moves each roller assembly 120 from a retracted position 130 to a use position 140, or the reverse. In use position 140, roller assemblies 120 of loading device 100 can move an item 240 to a desired position. With retracted position 130, item 240 can remain in place on loading device 100 until removal of item 240 therefrom is desired. For example, item 240 can be boat 104 of FIG. 1 or another desired item.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A loading device comprising:
   a) the loading device having a retracted position and a usable position;
   b) the loading device comprising a housing, an adjustable wheel assembly, and a wheel adjusting device;
   c) the adjustable wheel assembly including at least one wobble roller;
   d) the at least one wobble roller having an axle, the axle having at least one first end;
   e) the adjustable wheel assembly being substantially contained within the housing when the loading device is in the retracted position;
   f) the housing having a top platform, a bottom platform, and at least one side platform, with the top platform being oppositely disposed from the bottom platform, and the side platform extending between the top platform and the bottom platform;
g) the side platform having a primary axis extending along the length of the side platform;
h) the top platform including a top-platform opening for each of the at least one wobble roller;
i) the at least one wobble roller being extendible above the top platform through the top-platform opening to achieve the usable position of the loading device;
j) the side platform including at least one side-platform slot, the side-platform slot having a primary axis extending from the top platform to the bottom platform and being substantially perpendicular to the primary axis of the side platform;
k) the side-platform slot on the side platform receiving the at least one first end of the axle;
l) the side-platform slot engaging with the at least one first end of the axle to limit the range of motion for the axle to a substantially upward motion along the axis of the slot towards the top platform of the housing, and a substantially downward motion along the axis of the slot towards the bottom platform of the housing;
m) the wheel adjusting device including at least one lift slide rail contained within the housing and engaged with the axle of the at least one wobble wheel;
n) the at least one lift slide rail comprising at least one lowered edge, at least one incline edge, and at least one raised edge;
o) the incline edge being contiguous with the lowered edge and raised edge;
p) the at least one lift slide rail being laterally movable in a forward motion and a rearward motion, such that the axle can be successively engaged with the lowered edge, the incline edge, and the raised edge of the at least one lift slide rail;
q) the lowered edge being at a level such that when the axle is engaged with the lowered edge, the wobble roller is in the lowered retracted position;
r) the raised edge being at a level such that when the axle is engaged with the raised edge, the wobble roller is in the raised useable position;
s) the axle being engaged with the incline edge permitting the forward lateral movement of the at least one lift slide rail causing the axle to be lifted upward in the slot, within the limited range of motion, until the axle reaches the raised edge; and
t) the axle being engaged with the incline edge permitting the rearward lateral movement of the at least one lift slide rail causing the axle to be lowered downward along the slot, within the limited range of motion, until the axle reaches the lowered edge.

2. The loading device of claim 1, further comprising:
a) the adjusting device including a hydraulic assembly;
b) the hydraulic assembly being connected to the at least one lift slide rail; and
c) the hydraulic assembly cooperating with the at least one lift slide rail to laterally move the at least one lift slide rail in either a forward motion or a rearward motion.

3. The loading device of claim 2, further comprising:
a) a hydraulic assembly positioned at a first end of the housing;
d) at least one end roller being positioned at a second end of the housing;
e) the at least one end roller being oppositely disposed from the hydraulic connection.

4. The loading device of claim 3, further comprising:
a) a c-clip on the first end of the axle; and
b) the c-clip permitting the axle to move in or about the side-platform slot.

5. The loading device of claim 3, further comprising the at least one lift slide being a first lift slide and a right lift slide.

* * * * *